(12) United States Patent
Milanovich et al.

(10) Patent No.: US 7,404,412 B2
(45) Date of Patent: Jul. 29, 2008

(54) INFLATION STEM WITH BLOW-OFF VALVE TO PREVENT OVERINFLATION

(76) Inventors: John Kostin Milanovich, Apt. 203, 1126 N. 15th Ave., Bozeman, MT (US) 59715-3266; Michael Jurgen Strasser, 546-B Presidio Blvd., San Franscisco, CA (US) 94129; Clinton Neal Slone, 1197 Church St., San Franscisco, CA (US) 94114; William Gregory Tammen, 3188 Cordova Way, Lafayette, CA (US) 94549

( * ) Notice: Subject to any disclaimer, the term of this patent is extended or adjusted under 35 U.S.C. 154(b) by 0 days.

(21) Appl. No.: 11/866,976

(22) Filed: Oct. 3, 2007

(65) Prior Publication Data
US 2008/0078450 A1    Apr. 3, 2008

Related U.S. Application Data

(60) Provisional application No. 60/828,068, filed on Oct. 3, 2006.

(51) Int. Cl.
*F16K 15/20* (2006.01)
(52) U.S. Cl. .................. 137/226; 137/230; 152/429
(58) Field of Classification Search .......... 137/230, 137/226–228; 152/415, 427, 429; 73/146.8, 73/700, 714; 141/2, 38; 340/442–447
See application file for complete search history.

(56) References Cited

U.S. PATENT DOCUMENTS

| | | | | |
|---|---|---|---|---|
| 1,137,209 A | * | 4/1915 | Henemier | 137/226 |
| 1,137,521 A | * | 4/1915 | Noe | 137/226 |
| 1,166,221 A | * | 12/1915 | Kahn | 137/226 |
| 1,282,613 A | * | 10/1918 | Millea | 137/227 |
| 1,772,107 A | * | 8/1930 | Nelson | 137/226 |
| 3,217,733 A | * | 11/1965 | Howard et al. | 137/226 |
| 3,450,147 A | * | 6/1969 | Webb | 137/226 |
| 3,491,786 A | * | 1/1970 | Bermingham et al. | 137/226 |
| 3,719,198 A | * | 3/1973 | Wilhelm et al. | 137/228 |
| 3,789,867 A | * | 2/1974 | Yabor | 137/227 |

(Continued)

FOREIGN PATENT DOCUMENTS

WO    WO 02/062595    8/2002

*Primary Examiner*—John Rivell
*Assistant Examiner*—Craig Price
(74) *Attorney, Agent, or Firm*—Swift Law Office; Stephen Christopher Swift

(57) ABSTRACT

An inflation stem having an inflation valve combined with a blow-off valve to prevent overinflation. The valves are forced open during inflation when the actuating pin is depressed by the compressor chuck head, opening a fill chamber through which fluid flows into an inflatable object, and also opening a blow-off chamber. A blow-off intake allows lower pressure fluid from the interior of the object to enter the blow-off chamber. The fluid entering the blow-off chamber is isolated from the high pressure fluid coming in from the compressor through the fill chamber by a separation fin and shield joined to the bottom end of the actuating pin. A blow-off gasket is biased upward by a blow-off spring. But as pressure in the object and the blow-off chamber increases, the blow-off gasket is forced down, until at the predetermined pressure it is pushed past a blow-off port, through which fluid then escapes.

20 Claims, 3 Drawing Sheets

U.S. PATENT DOCUMENTS

| | | | |
|---|---|---|---|
| 3,830,249 A * | 8/1974 | Fleenor et al. ............... 137/227 |
| 3,859,849 A | 1/1975 | Novak |
| 3,994,312 A * | 11/1976 | Tanner et al. ............... 137/226 |
| 4,015,623 A | 4/1977 | Wanstreet |
| 4,064,897 A | 12/1977 | Weber |
| 4,246,930 A | 1/1981 | Bishop et al. |
| 4,445,527 A | 5/1984 | Leimbach |
| 4,869,306 A | 9/1989 | Keys |
| 4,944,323 A * | 7/1990 | Bartholomew et al. ...... 137/227 |
| 5,029,604 A | 7/1991 | Spektor et al. |
| 5,054,511 A | 10/1991 | Tuan et al. |
| 5,181,977 A | 1/1993 | Gneiding et al. |
| 5,365,967 A | 11/1994 | Moore |
| 5,694,969 A | 12/1997 | DeVuyst |
| 5,778,923 A | 7/1998 | Marston |
| 6,296,010 B1 | 10/2001 | DeLauer |
| 6,302,138 B1 | 10/2001 | Sumrall |
| 6,772,812 B1 * | 8/2004 | Hamilton .................... 152/415 |
| 6,948,516 B1 | 9/2005 | Williams |
| 7,073,527 B1 * | 7/2006 | Freire Teiga ................ 137/226 |

* cited by examiner

INFLATION STEM WITH BLOW-OFF VALVE TO PREVENT OVERINFLATION

CROSS REFERENCE TO RELATED APPLICATION

This application is based on and claims the benefit of Provisional Patent Application Ser. No. 60/828,068, filed Oct. 3, 2006, which is incorporated herein by reference.

BACKGROUND OF THE INVENTION

1. Field of the Invention

The present invention relates to inflation stems for tires, tubes or other inflatable objects, through they are inflated on motor vehicles, pedal-driven vehicles, airplanes, trailers, garden equipment, etc.

2. Description of the Prior Art

There have been previous inventions for releasing excess pressure from tires, tubes or other inflatable objects, but none that are equivalent to the present invention.

U.S. Pat. No. 3,859,849, issued on Jan. 14, 1975, to Greg A. Novak, discloses a valve stem pressure indicator, that releases air and whistles when the pressure in a tire is above a set level. As the air pressure increases, a piston valve is moved upward past a whistle aperture. The instant invention is distinguishable, in that it has a separate chamber to isolate incoming high pressure, an intake going deep into the tire, and its blow-off gasket is moved down as pressure increases, until it passes the blow-off port.

U.S. Pat. No. 4,015,623, issued on Apr. 5, 1977, to Gregory E. Wanstreet, discloses a tire valve with pressure release means, with separate flow passages for air being pumped in and air being released out, which are not in a single stem, and are without an isolated pressure tap, as in the instant invention.

U.S. Pat. No. 4,064,897, issued on Dec. 27, 1977, to Rudiger Weber, discloses a tire filler valve arrangement, with an overpressure valve in its side, rather than having coaxial moving parts, as in the instant invention.

U.S. Pat. No. 4,246,930, issued on Jan. 27, 1981, to William V. Bishop and Donald L. Richards, discloses a relief valve for racing car tires, without an isolated pressure tap, as in the instant invention.

U.S. Pat. No. 4,445,527, issued on May 1, 1984, to Richard C. Leimbach, discloses a tire valve extension including a relief valve, which is screwed onto a tire stem, rather than being a replacement for the tire stem, and without an isolated pressure tap, as in the instant invention.

U.S. Pat. No. 4,869,306, issued on Sep. 26, 1989, to Kenneth B. Keys, discloses an air inlet and automatic pressure adjustment device for a tire, having a large outer cylinder through air is pumped in, and a small inner cylinder through which air can be released, with the two cylinders having a partially common wall, and not having coaxial moving parts, nor having a separate intake for the release valve, as in the instant invention.

U.S. Pat. No. 5,029,604, issued on Jul. 9, 1991, to Semyon Spektor, Mark Gozokhovsky and Ilya Zhabokrug, discloses a safety core for a tire valve, that is screwed into the valve's housing. The instant invention is distinguishable, in that its blow-off valve is only actuated when the tire is being inflated.

U.S. Pat. No. 5,054,511, issued on Oct. 8, 1991, to C. T. Tuan and T. L. Duan, discloses a tire valve having an automatic pressure release device, with spring and ball valves that are not used in the instant invention, and without the isolated pressure tap of the instant invention.

U.S. Pat. No. 5,181,977, issued on Jan. 26, 1993, to Donald R. Gneiding and Oscar J. Peterson, discloses a tire inflation valve having overpressure and flow control, which shuts off the intake when the pressure of incoming air exceeds a predetermined value, rather than limiting internal tire pressure as in the instant invention.

U.S. Pat. No. 5,365,967, issued on Nov. 22, 1994, to John C. Moore, discloses a safety tire valve, that releases overinflation air through a whistling reed configuration. The instant invention is distinguishable, in that it has a blow-off intake that is separate from the inflation intake, which will only release air when the tire is being filled.

U.S. Pat. No. 5,694,969, issued on Dec. 9, 1997, to Christopher DeVuyst, discloses a pressure relief tire valve, without a separate blow-off intake, as in the instant invention.

U.S. Pat. No. 5,778,923, issued on Jul. 14, 1998, to Philip William Marston, discloses an anti-seepage self-gauging inflation valve system. The instant invention is distinguishable, in that in it the blow-off chamber seal and filling chamber seal are connected to same shaft, and both are activated by a chuck pin, rather than one by the chuck pin and the other by the chuck body.

U.S. Pat. No. 6,296,010, issued on Oct. 2, 2001, to Gerard Michael DeLauer, discloses an automatic shut-off air pressure valve for tires, having a double stem, rather than a single stem as in the instant invention.

U.S. Pat. No. 6,302,138, issued on Oct. 16, 2001, to Dirk Lee Sumrall, discloses a pressure indicating valve and core, without a blow-off intake from deep in the interior of the tire, as in the instant invention.

U.S. Pat. No. 6,948,516, issued on Sep. 27, 2005, to Harold Williams, discloses an excess tire air pressure relief valve, and an inflation valve in a separate location, not in the same tire stem as in the instant invention.

PCT International Publication No. WO 02/062595 A1, published on Aug. 15, 2002, to Vaughan Grant and Stephen John Furlonger, discloses a pressure relief valve that is removably inserted into a tire stem.

None of the above inventions and patents, taken either singly or in combination, is seen to describe the instant invention.

SUMMARY OF THE INVENTION

The present invention is an inflation stem having an inflation valve combined with a blow-off valve to prevent overinflation. Although primarily designed for automobile tires, it could also be used for bicycle tubes, other vehicles or equipment having wheels with tires or tubes, or other inflatable objects. Although designed primarily for Schrader valves, it may be adapted for Presta valves, or other kinds of valves. The invention allows the user to fill his or her tire to a predetermined level. When the predetermined level is reached, the blow-off valve opens, preventing the user from continuing to fill the tire.

In a Schrader valve tire stem, the valve is kept shut partly by the pressure of air inside the tire against the head of an actuating pin, and partly by an spring (not present in a Presta valve) surrounding the upper portion of the shaft of the actuating pin, which biases the valve toward a closed position. The valve is forced open during inflation when the actuating pin is depressed by the compressor chuck head, opening a fill chamber through which air flows into the tire. In the present invention, depressing the actuating pin also opens a blow-off chamber. A blow-off intake is perpendicular to the exit of the fill chamber, and allows lower pressure air from the interior of the tire (that is away from the high pressure air in the vicinity of the exit of the fill chamber) to enter the blow-off chamber. The air entering the blow-off chamber is isolated from the high-pressure air coming in from the compressor through the fill chamber by a separation fin and air shield joined to the bottom end of the actuating pin. This allows the pressure inside the blow-off chamber to remain the same as the pressure in the interior of the tire, despite the high pressure in the fill chamber during inflation. A blow-off gasket is biased upward (or downward) by a blow-off spring. But as pressure in the tire and the blow-off chamber increases, the blow-off gasket is forced down (or up), until at the predetermined pressure it is pushed past a blow-off port, through which air then escapes. The blow-off port may whistle as the air escapes, to alert the user that the tire has been fully inflated.

Accordingly, it is a principal object of the invention to provide an improved means for preventing tires or tubes from being overinflated.

It is another object of the invention to provide a means for limiting tire or tube pressure when the pressure in the interior of the tire or tube exceeds a given level when the tire or tube is being filled (at cold pressure), while avoiding bleeding the tire when the pressure rises due to heat under normal driving conditions.

It is a further object of the invention to provide a means for limiting tire or tube pressure, wherein the path through which air enters the tire or tube during inflation is isolated from the path through which excess air escapes, thus preventing premature release of air caused by the pressure in the vicinity of the stem being greater the pressure in the interior of the tire or tube.

Still another object of the invention is to provide an audible alert when pressure in a tire or tube has exceeded a given level.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
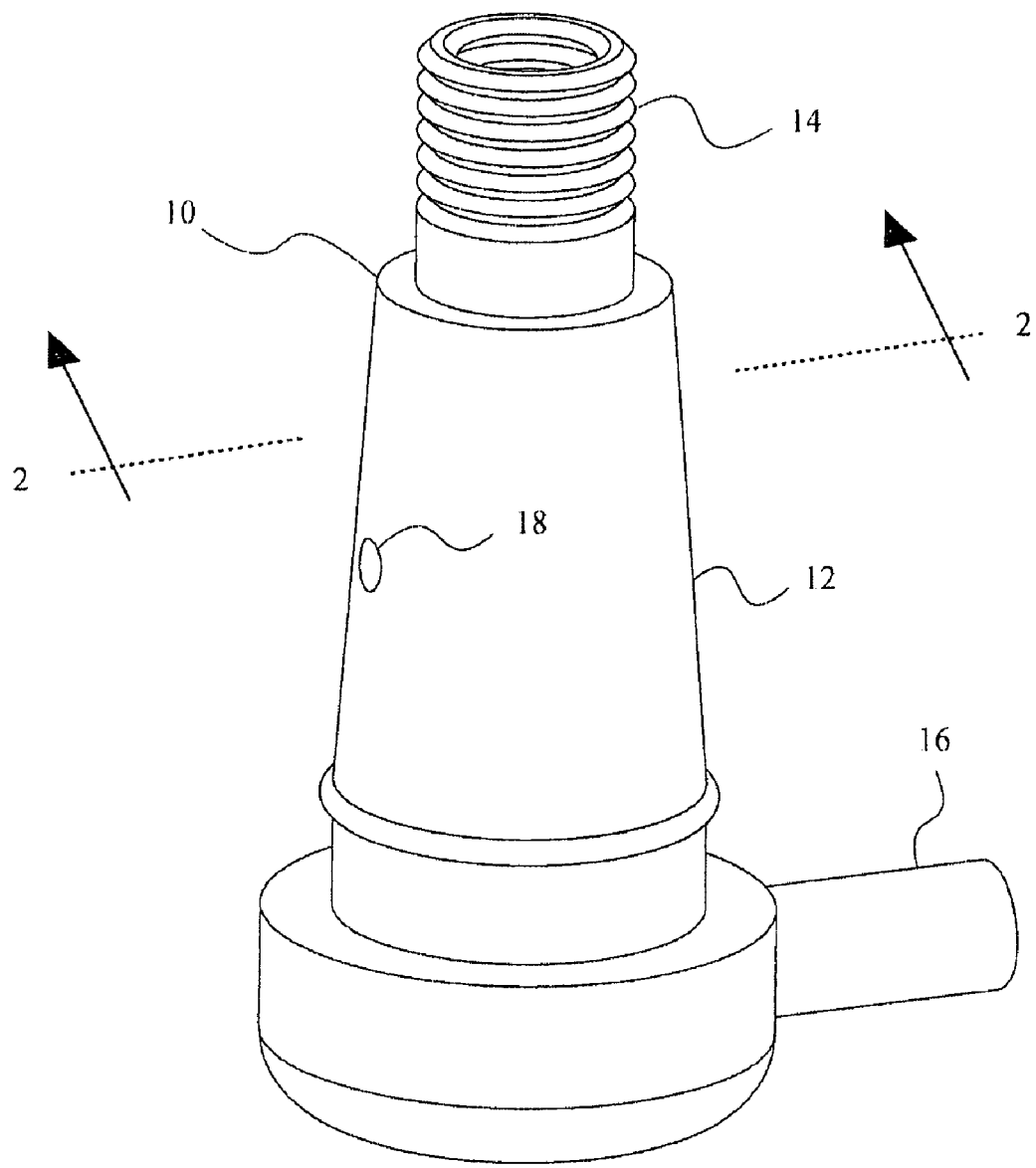
FIG. 1 is perspective view of the preferred embodiment of the invention.

The present invention is an inflation stem for tires, tubes and other inflatable objects, having a preferred embodiment 10, that is shown in a perspective view in FIG. 1. (References to "tires" should be understood to also include "tubes" and other inflatable objects. References to "air" should be understood to include other fluids.) It has a rubber body 12, from which a metal body 14 extends. A blow-off intake 16 is connected to air deep within the interior of the tire. (Optionally, a hose extending deep into the middle of the tire may be attached to the blow-off intake.) Air escapes from a blow-off port 18 only when the air pressure in the interior of the tire exceeds a predetermined ratio of mass to area (e.g., 32 pounds per square inch).

Figure 2:
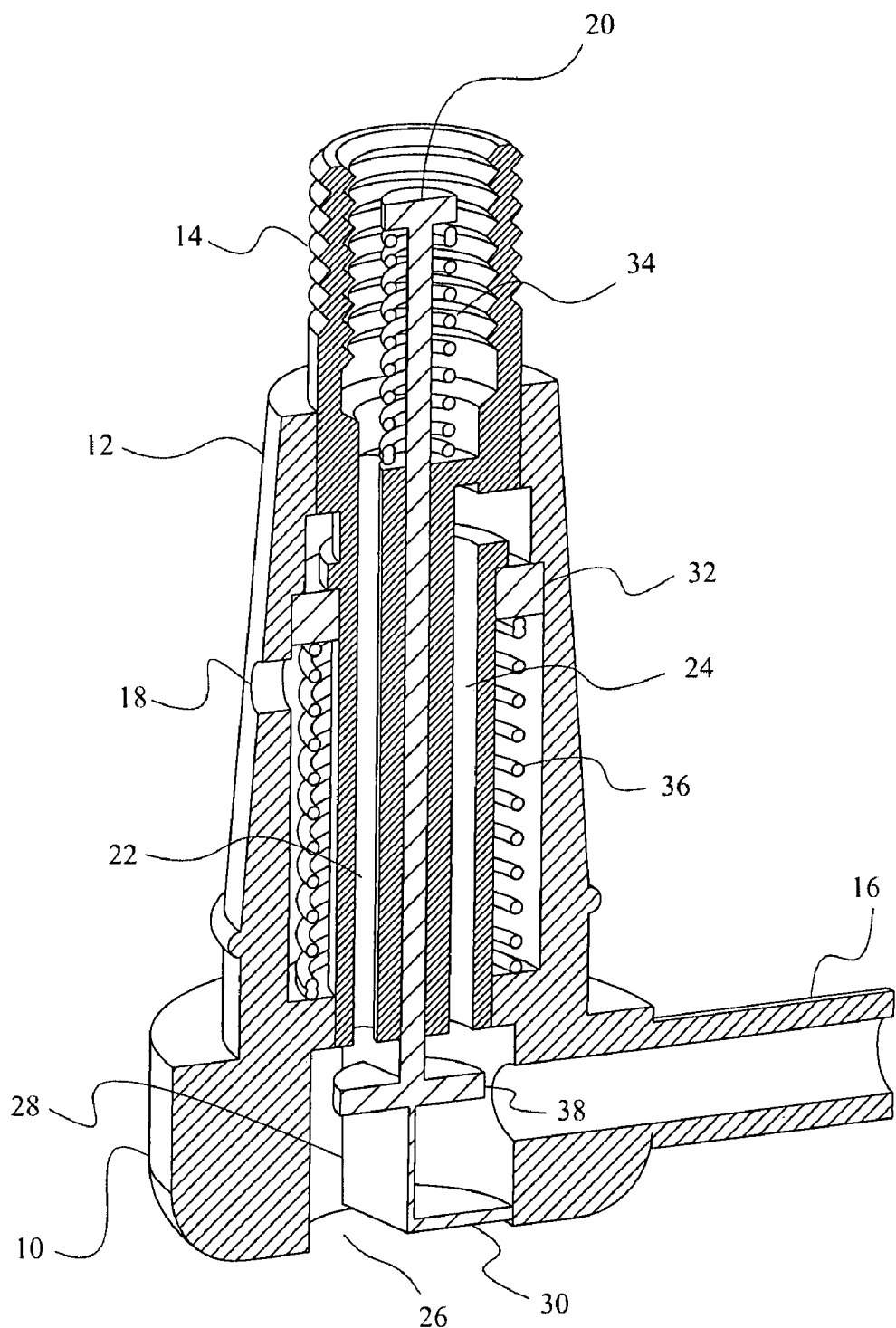
FIG. 2 is a sectional view of the preferred embodiment of the invention, drawn along lines 2B2 of FIG. 1.

FIG. 2 is a sectional view of the preferred embodiment of the invention, drawn along lines 2-2 of FIG. 1. When a tire having the stem of the present invention is being inflated, actuating pin 20 is depressed by a compressor chuck head (not shown in the drawings). This opens both the fill chamber 22 and the blow-off chamber 24. As air flows from the high pressure compressor into the fill chamber and then into the tire, the pressure inside the tire slowly increases. The blow-off intake 16 is preferably perpendicular to the exit 26 of the fill chamber, and allows access to the undisturbed air inside the tire. (Alternatively, the blow-off intake may be parallel or at an obtuse or acute angle to the exit.) The air in the blow-off intake is isolated from the incoming high-pressure air from the compressor by separation fin 28 and air shield 30. This allows the pressure inside the blow-off chamber 24 to remain the same as the internal pressure in the tire during inflation. When the predetermined pressure is exceeded inside the tire, the blow-off gasket 32 is forced down by the excess air pressure in the blow-off chamber, and air escapes through the blow-off port, until the air pressure drops to the predetermined level and the gasket rises to close the blow-off port. (Alternatively, the invention may be constructed so that the blow-off gasket is forced up by excess air pressure in the blow-off chamber, and when pressure drops the gasket falls to close the blow-off port.) Optionally, the blow-off port may be suitably dimensioned and configured to emit an audible sound, such as a whistle, when air is released, to alert users that inflation should be terminated. The actuating pin 20 is biased upward by the actuating pin spring 34. The blow-off gasket 32 is biased upward by the blow-off spring 36. Seal 38 closes the blow-off chamber to prevent air from escaping from the interior of the tire, except when the actuating pin is depressed by the compressor chuck head.

Figure 3:
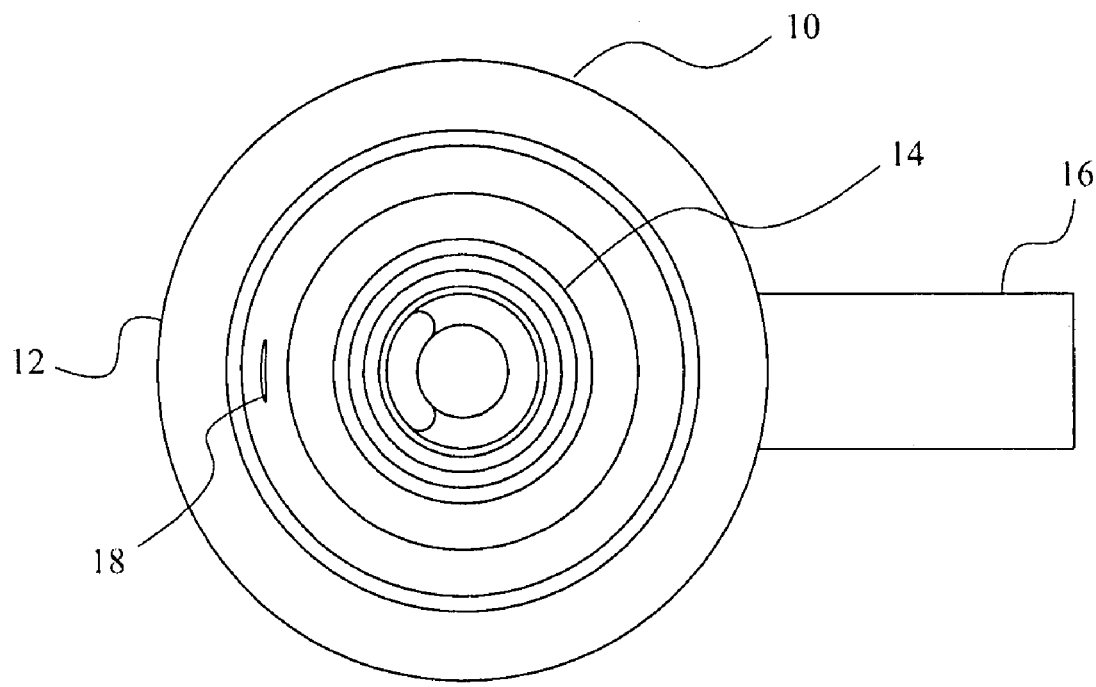
FIG. 3 is a top view of the preferred embodiment of the invention.

FIG. 3 is a top view of the preferred embodiment 10, again showing the rubber body 12, the metal body 14, the blow-off intake 16, and the blow-off port 18.

It is to be understood that the present invention is not limited to the embodiment described above, but encompasses any and all embodiments within the scope of the following claims.

We claim:

1. An inflation stem, comprising:
    an inflation valve, that is biased to a closed position partly by the pressure of fluid inside an inflatable object, and partly by an elastic member;
    a valve actuating pin, that when depressed by a filling device, forces the inflation valve open, and simultaneously opens both a fill chamber through which the fluid flows into the inflatable object and a blow-off chamber, said fill chamber and said blow-off chamber being isolated from one another;
    a blow-off chamber intake that is substantially separated from a fill chamber exit, and enables the pressure within the blow-off chamber to remain the same as the general pressure inside the inflatable object; and
    a blow-off valve biased to a closed position, but being forced open when the pressure within the blow-off chamber exceeds a predetermined pressure.

2. The inflation stem according to claim 1, wherein the elastic member is a spring.

3. The inflation stem according to claim 1, wherein the valve actuating pin is depressed by a compressor chuck head.

4. The inflation stem according to claim 1, wherein the inflatable object is a tire.

5. The inflation stem according to claim 1, wherein the inflatable object is a tube.

6. The inflation stem according to claim 1, wherein the fluid is air.

7. The inflation stem according to claim 1, wherein:
the pressure of the fluid inside the inflatable object that biases the inflation valve to a closed position is exerted against a head of the valve actuating pin; and
the blow-off chamber intake is perpendicular to the exit of the fill chamber intake.

8. The inflation stem according to claim 1, wherein the fluid in the blow-off chamber is separated from the fluid in the fill chamber by a separation fin and shield joined to a bottom end of the actuating pin.

9. The inflation stem according to claim 1, including a blow-off gasket that is biased upward by a blow-off spring, said blow-off gasket being forced down as pressure in the inflatable object and the blow-off chamber increases, until at a predetermined pressure it is pushed past a blow-off port, through which fluid then escapes.

10. The inflation stem according to claim 9, wherein the fluid is air, and the blow-off port is suitably dimensioned and configured to whistle as air escapes.

11. An inflation stem, comprising:
an inflation valve, that is biased to a closed position by the pressure of fluid inside an inflatable object;
a valve actuating pin, that when depressed by a filling device, forces the inflation valve open, and simultaneously opens both a fill chamber through which the fluid flows into the inflatable object and a blow-off chamber, said fill chamber and said blow-off chamber being isolated from one another;
a blow-off chamber intake that is substantially separated from a fill chamber exit, and enables the pressure within the blow-off chamber to remain the same as the general pressure inside the inflatable object; and
a blow-off valve biased to a closed position, but being forced open when the pressure within the blow-off chamber exceeds a predetermined pressure.

12. The inflation stem according to claim 11, wherein the valve actuating pin is depressed by a compressor chuck head.

13. The inflation stem according to claim 11, wherein the inflatable object is a tire.

14. The inflation stem according to claim 11, wherein the inflatable object is a tube.

15. The inflation stem according to claim 11, wherein the fluid is air.

16. The inflation stem according to claim 11, wherein:
the pressure of the fluid inside the inflatable object that biases the inflation valve to a closed position is exerted against a head of the valve actuating pin; and
the blow-off chamber intake is perpendicular to the exit of the fill chamber intake.

17. The inflation stem according to claim 11, wherein the fluid in the blow-off chamber is separated from the fluid in the fill chamber by a separation fin and shield joined to a bottom end of the actuating pin.

18. The inflation stem according to claim 11, including a blow-off gasket that is biased upward by a blow-off spring, said blow-off gasket being forced down as pressure in the inflatable object and the blow-off chamber increases, until at a predetermined pressure it is pushed past a blow-off port, through which fluid then escapes.

19. The inflation stem according to claim 18, wherein the fluid is air, and the blow-off port is suitably dimensioned and configured to whistle as air escapes.

20. An inflation method, comprising the steps of:
attaching an inflation valve to an inflatable object, said inflation valve being biased to a closed position by the pressure of fluid inside an inflatable object;
depressing a valve actuating pin by a filling device, thus forcing the inflation valve open, and simultaneously opening both a fill chamber through which the fluid flows into the inflatable object and a blow-off chamber, said fill chamber and said blow-off chamber being isolated from one another;
enabling the pressure within the blow-off chamber to remain the same as the general pressure inside the inflatable object, by means of a blow-off chamber intake that is substantially separated from a fill chamber exit; and
preventing overinflation by means of a blow-off valve biased to a closed position, that is forced open when the pressure within the blow-off chamber exceeds a predetermined pressure.

* * * * *